Nov. 2, 1954

O. VON ZELEWSKY 2,693,125

TWO-CUT ATTACHMENT FOR LATHES

Filed Sept. 12, 1950

INVENTOR:
Ottomar von Zelewsky
BY
Richard y Geier
ATTORNEYS

INVENTOR:
Ottomar von Zelewsky

Nov. 2, 1954     O. VON ZELEWSKY     2,693,125
TWO-CUT ATTACHMENT FOR LATHES
Filed Sept. 12, 1950     4 Sheets-Sheet 3
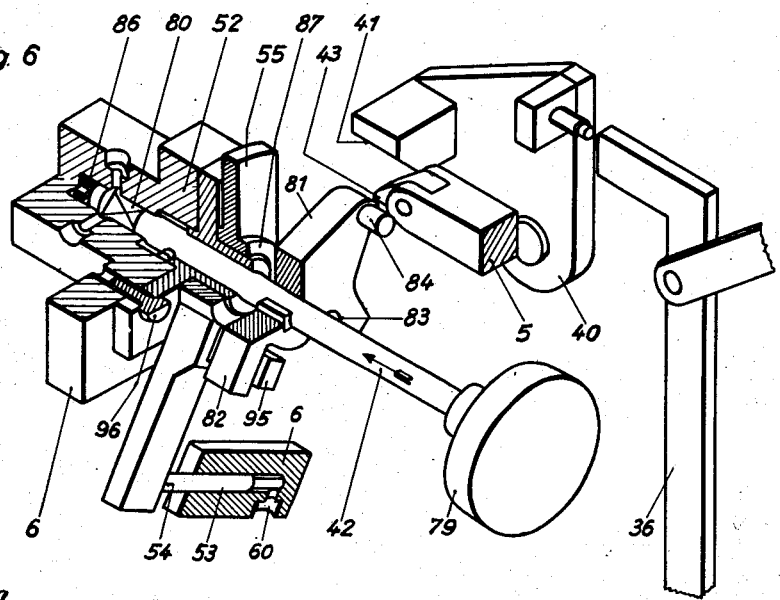
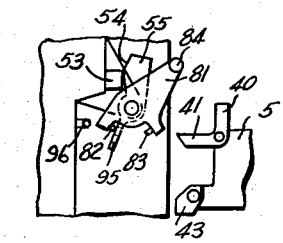
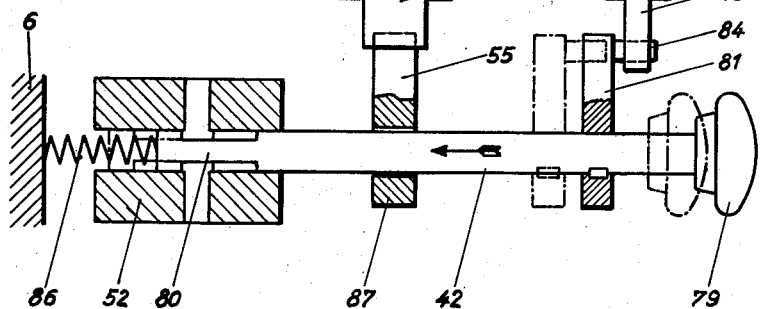
INVENTOR:
Ottomar von Zelewsky
BY
ATTORNEYS Nov. 2, 1954    O. VON ZELEWSKY    2,693,125
TWO-CUT ATTACHMENT FOR LATHES
Filed Sept. 12, 1950    4 Sheets-Sheet 4

INVENTOR:
Ottomar von Zelewsky
BY
Richards y Geier
ATTORNEYS.

United States Patent Office 2,693,125
Patented Nov. 2, 1954

2,693,125

TWO-CUT ATTACHMENT FOR LATHES

Ottomar von Zelewsky, Neuhausen am Rheinfall, Switzerland, assignor to Georg Fischer Aktiengesellschaft, Schaffhausen, Switzerland, a company of Switzerland Application September 12, 1950, Serial No. 184,451

7 Claims. (Cl. 82—14)

The present invention relates to a two-cut attachment for lathes whereby a cycle of two successive turning operations is performed, with a hydraulic copying attachment in which a tracer point or stylo in conjunction with a control piston, scanning a master pattern rigidly fixed to the machine frame, regulates the in-feed of a tool slide displaceable transversally to the direction of travel of a saddle.

It has proved advantageous, when using lathes equipped with hydraulic copying attachments, to machine workpieces in two turning operations of which the one immediately succeeds the other; for example, in a rough-turning operation and in a finish-turning operation immediately succeeding the same. It was expedient for this purpose to carry out the entire machining cycle on an automatic basis.

According to the present invention the control and locking members which must be brought by hand into operating position for the purpose of initiating the first turning operation are, before the second turning operation commences, automatically operated by tripping members, in which connection, by means of resetting members acting on the hydraulic copying attachment, a change in the distance between the turning tool and the point of contact of the stylo with the pattern is produced and, on completion of the second turning operation, the tool slide is automatically retained in the initial position by locking members.

Two embodiments of the invention are illustrated in the annexed drawing, in which:

Fig. 1a shows diagrammatically the control, locking and tripping members in their positions for carrying out the first turning operation;

Fig. 3 is a schematic representation of the arrangement of the control members;

Fig. 6 is a perspective representation of a partial, section through the control, locking and tripping members;

Figure 1:
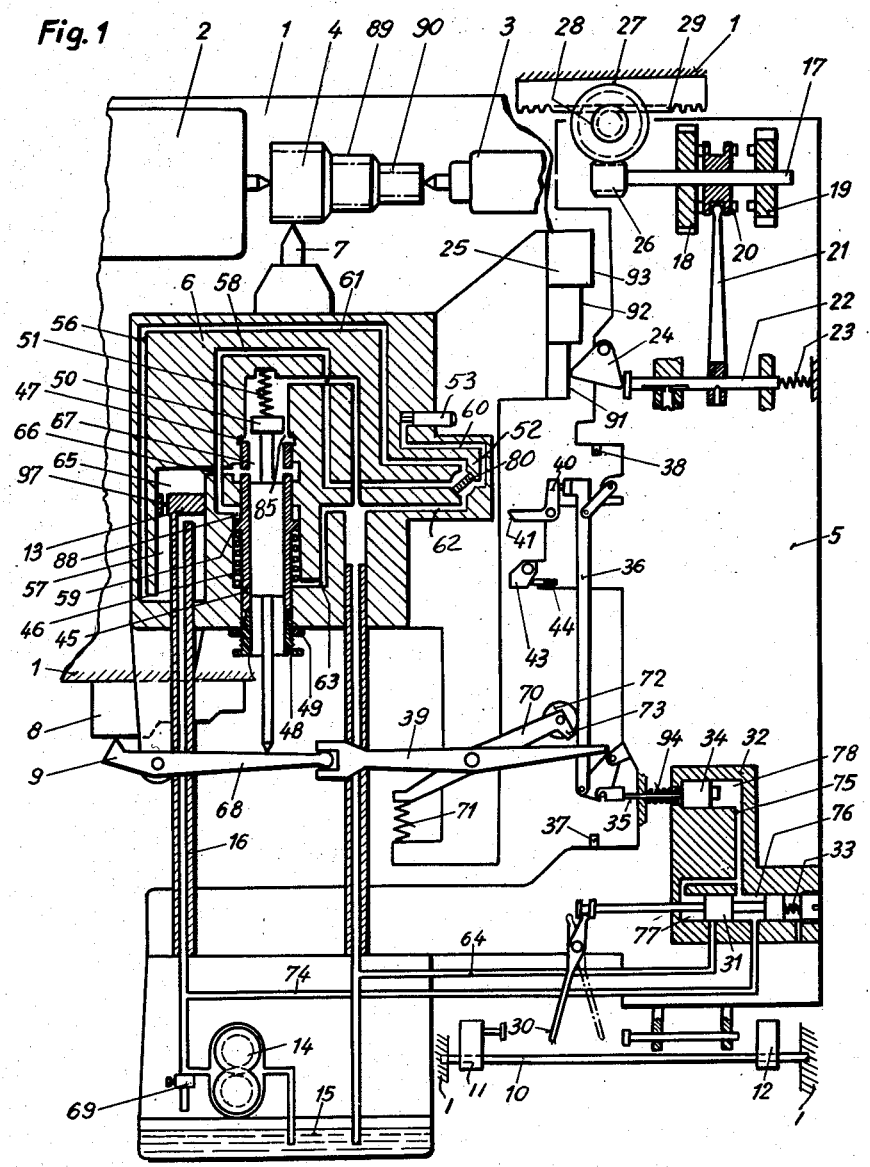
Fig. 1 is a schematic representation of a first embodiment of the resetting members; the tool slide is in the requisite position for carrying out the first turning operation.

Figs. 1 and 1a show fragmentarily-represented parts of a lathe bed 1 with a headstock 2 and a tailstock 3. By means not shown in the drawing a workpiece 4 chucked between said headstock 2 and said tailstock 3 is set in rotary motion from the headstock 2. A saddle 5 is slidable on the lathe bed 1, on slides or ways not shown, in a direction parallel to the axis of rotation of said workpiece 4. A tool slide 6 with a lathe tool 7 slides, on a differential piston 13 rigidly connected to the saddle 5 and on guideways not shown in the drawing, perpendicularly or at an angle to the direction of travel of the saddle 5. A pattern 8, the lower, profiled edge of which can be scanned by a stylo or tracer point 9 conducted over it, is rigidly connected to the lathe bed 1. Also secured to the lathe bed 1 is a trip shaft 10 on which one left-hand and one right-hand stop or trip block, 11 and 12 respectively, are so arranged as to be longitudinally slidable thereon. Located at the bottom of the saddle 5, in the tank 15 containing the hydraulic pressure medium, is a pump 14 driven by means not shown, and a pressure pipe 16 leads to the differential piston 13. For the purpose of maintaining a constant pressure in the pressure pipe 16 a relieving valve 69 is provided. In a port 97 of the differential piston 13 is a pressure-reducing valve not shown, through which hydraulic pressure medium under variable pressure can pass from the chamber 57 at a constant pressure into chamber 65. Mounted in the saddle 5 is a schematically represented feed gear consisting of the worm shaft 17, the two gearwheels 18 and 19, and the coupling member 20, which can be operated by a rod 21 and a control shaft 22. By means of a spring 23 the control shaft 22 is pressed against a pawl 24 which is able to slide on a slide rail 25 fixed to the tool slide 6 and bearing adjustable trip blocks 91, 92 and 93. The worm 26 engages with a wormwheel 27 connected to a pinion 28 engaging with a toothed rack 29. The rack 29 is secured to the lathe bed 1 and the two gearwheels 18 and 19 controlling a feeding and a return motion of the saddle 5 are driven by means not shown via suitable gearing.

Also built on to the saddle 5 is a resetting lever 30, which operates a distributing piston 31 in a control block 32, in which a spring 33 tends to force the distributing piston 31 to the left. A piston 34 is connected by a rod 35 to a slide bar 36 articulated to the saddle 5 and adjustable parallelly to itself. Two stops 37 and 38 are fitted to the saddle 5 for the auxiliary scanning lever 39, which is pivotally secured to the tool slide 6. These two stops 37 and 38 become operative only when the tool slide 6 reaches its top or bottom position relatively to the saddle 5. A bell-crank lever 40 mounted on the saddle 5 is able to act on the slide bar 36 when the cam 55 of the cam lever 87 bears against the face 41 of the bell-crank lever 40 from below. In addition, a pawl 43 acting as a tripping member is forced by the action of a spring 44 into the position shown, and can be swung in the downward direction only.

In the tool slide 6 an adjustable sleeve 45 with a collar 59 is axially slidable in bores made to fit it, and is pressed by a spring 46 against the shoulder 47. The extent to which the adjustable sleeve 45 is adjustable, which extent determines the depth of chip-removal of the second cut when working with the two-cut attachment, is set by means of an adjusting nut 48 and locknut 49. Slidingly arranged in the adjustable sleeve 45 is a control piston or plunger 50, which is pressed by a spring 51 downwards against the scanning arm 68. By turning the shaft 42, a friction plate 80 is operated in the distributing slide valve 52; a piston 53, when displaced to the right by a hydraulic pressure medium, encounters the contact surface 54 of a cam 55 on a cam lever 87.

In the tool slide 6, a duct 56 leads from the chamber 57 below the differential piston 13 to the distributing slide valve 52, whence a further duct 58 leads to the annular chamber 88 above the collar 59 of the adjustable sleeve 45. From the distributing slide valve 52 a further duct 60 leads to the plunger 53. The ducts 61, 62 and 63 lead to a return pipe 64, which leads back into the hydraulic medium tank 15. From the chamber 65 above the differential piston 13 a port 66 leads into the annular chamber 67 of the control piston 50.

A scanning arm 68 is pivotally mounted on the tool slide 6, which scanning arm 68 engages with the auxiliary scanning lever 39 and whose contact point or stylo 9 can scan a pattern 8 secured to the lathe bed 1. An auxiliary lever 70 is pivotally secured to the tool slide 6 and is, swivelled in a clockwise direction by a spring 71: a roller 72 travels along the slide bar 36 and a lug 73 bears on the auxiliary scanning lever 39 when the auxiliary lever 70 is swivelled in a clockwise direction. A pipe 74 leads from the pressure pipe 16 to the control block 32 and a duct 75 from the annular chamber 76 into the chambers 77 and 78. The control members comprise the shaft 42 with a handwheel 79 rigidly connected thereto, a friction plate 80 of the distributing slide valve 52, and a lever 81 with the lugs 82 and 83 and the pin 84. The shaft 42 is axially displaceable against the pressure of the spring 86 (Figs. 3 and 6).

A cam lever 87, provided with a cam 55 a contact surface 54 for the plunger 53, and a lug 95 which is able to bear against the lugs 82 and 83 of the lever 81, is provided as a locking member pivotally and slidingly disposed on the shaft 42. In its outermost position to the right of the cam lever 87 the lug 95 bears against a stop 96 of the tool slide 6. It would also be possible, however, to attach the control and locking members to the saddle and the tripping members to the tool slide, which arrangement would not modify the functioning of the said members or of the two-cut attachment.

Figures 2A, 4, 5:
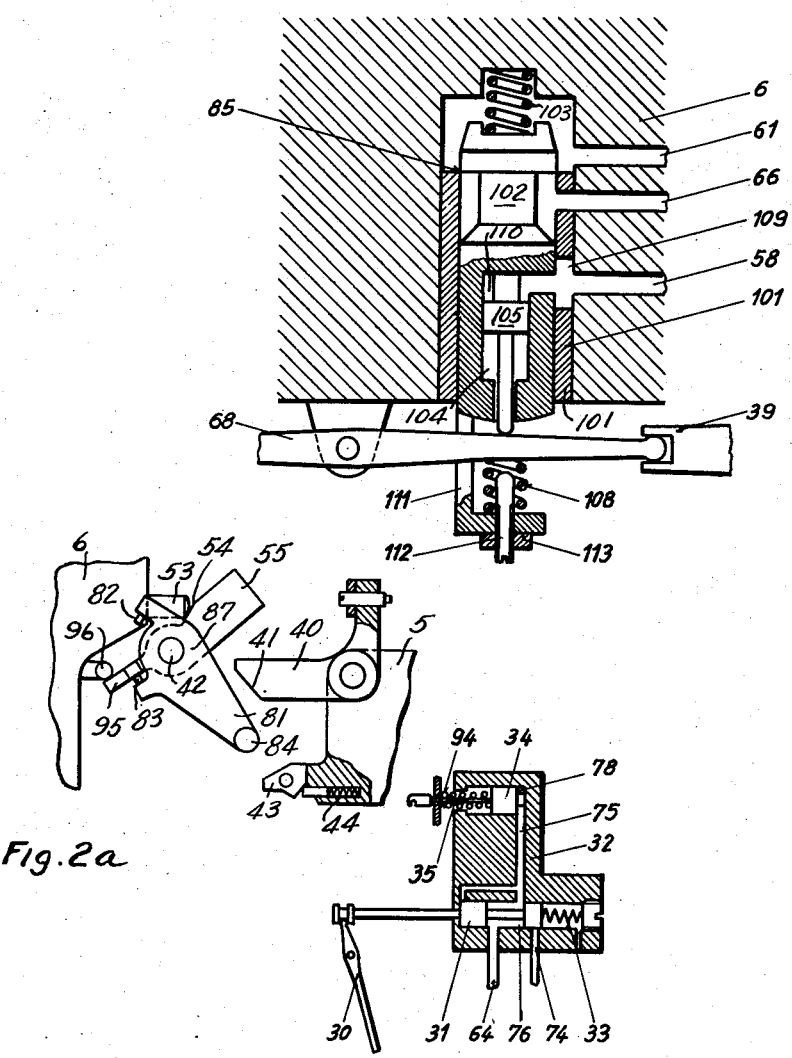
Fig. 2a shows diagrammatically the control, locking and tripping members in the act of rising the tool slide for carrying the second turning operation.
Fig. 4 is a section through the control block; during the lowering movement of the tool slide.
Fig. 5 is a section through the resetting members of a second embodiment.

Figure 5 illustrates a further embodiment of the scanning-arm setting assembly. All other parts correspond to those of the embodiment illustrated in Figs. 1 to 4, and 6.

Fitted into the tool slide 6, in a sleeve 101, is a control piston 102 which is forced downwards by a spring 103. Piercing the sleeve 101 is a slot 109 communicating with a duct 58; in a central bore 104 of the control piston 102 an adjustable plunger 105 is slidingly arranged, and a compression chamber 110 communicates with the slot 109. At the lower end of the control piston 102 is arranged a bracket 111 in which is fitted a set screw 112 with a locknut 113.

The spring 108 on the set screw 112 forces the scanning arm 68 upwards against the adjustable plunger 105 until the latter is brought to a stop within the control piston 102. The adjustable clearance between the set screw 112 and the scanning arm 68 is equivalent to the depth of cut (thickness of chip) of the second chip when operating with the two-cut attachment. If a hydraulic pressure medium is supplied to the compression chamber 110 from the slot 109 and the duct 58, the adjustable plunger 105 is forced downwards and the resistance of the spring 108 is overcome, with the result that the scanning arm 68 rests on the set screw 112. The manner in which the first embodiment of a two-cut attachment with continuous-flow control illustrated by way of example in Figs. 1 to 4 and 6 to 9 operates is as follows:

A workpiece 4 is to be so machined in one cycle of two operations or cuts of which the second automatically succeeds the first, in such a way that at the first cut, for instance a rough-turning operation with a finishing allowance, the workpiece 4 is to be machined in accordance with the contour 89, shown in continuous outline in Fig. 1, of the pattern 8, and at the second cut, for instance a finish-turning operation, said workpiece is to be machined to final dimensions, i. e., in accordance with the contour 90 drawn in dot-dash outline.

The sequence of operations of this two-cut attachment is as follows:

Starting up—copying the first cut—lowering and return travel from the first cut—raising of tool slide and copying of second cut—lowering and return travel from second cut. The processes by which these operations are accomplished are described in detail hereunder.

*Starting up.*—In the compressionless condition of the hydraulic copying attachment the tool slide 6 is located in its lowest position, in which the right end of the auxiliary scanning lever 39 rests on the stop 37. The resetting lever 30 is in the position, drawn in continuous outline in Fig. 1, in which it was left by the last return travel, and the lever 81 occupies the position shown in Fig. 2, the cam 55 of the cam lever 87 being directed to the right. The distributing slide valve 52 is in the position shown in Fig. 2.

If now the pump 14 is set in operation, hydraulic pressure medium under constant pressure is supplied from the pressure pipe 16 into the chamber 57 below the differential piston 13 and through the pressure-regulating valve, not shown, in the port 97, into the chamber 65 above the differential piston 13. As the tracer or stylo 9 is not resting on the pattern 8, the control piston 50 is forced downwards by the spring 51, so that the control gap 85 is closed. As a result of the rising pressure in the chamber 65, the tool slide 6 rises and keeps on rising until equilibrium is restored in the hydraulic system.

In addition, hydraulic pressure medium is fed into the pipe 74 (Fig. 1), the duct 75 and the chamber 78, whereby the piston 34 is forced to the left, so that the slide bar 36 and the parts connected thereto take up the respective positions shown in Fig. 1. In the control block 32 the distributing piston 31 is forced to the right, against the pressure of spring 33, by the pressure in the chamber 77.

As the tool slide 6 rises, the cam 56 encounters the face 41 of the bell-crank lever 40 (Fig. 7), whereby the slide bar 36 is shifted slightly to the right (Fig. 6). The traveller roller 72 travels downwards on the slide bar 36, thus causing the lug 73 to encounter the auxiliary scanning lever 39 and so pivot the latter and the scanning arm 68 that the control plunger 50 is moved in an upward direction. The control gap 85 opens slightly, and when a condition of equilibrium prevails in the hydraulic copying system the tool slide 6 comes to a halt on its upward travel.

Figure 8:
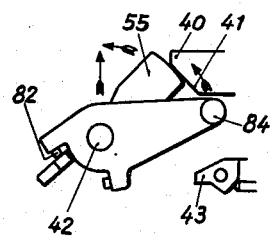
Fig. 8 is a schematic representation of the positions of the control, locking and tripping members during hand manipulation for the purpose of initiating the first turning operation.
Figure 9:
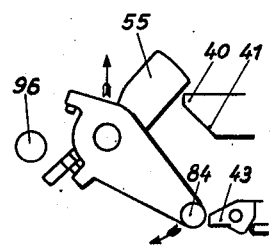
Fig. 9 is a schematic representation of the positions of the control, locking and tripping members; resetting for the second turning operation is just completed.

In this position the trip block 92 of the slide rail 25 is located in front of the pawl 24, so that the feed is still not engaged, i. e., the coupling member 20 is not in engagement with either of the two gearwheels 18 and 19. Copying the first cut: The handwheel 79 with shaft 42 and lever 81 is forced inwards in the direction of the arrow against the pressure of spring 86, and then turned counterclockwise through about 90° (Figs. 3, 6 and 8). Through this the friction plate 80 in the distributing slide valve 52 is brought into the position shown in Fig. 1, so that on the one hand hydraulic pressure medium is supplied from the duct 56 into the duct 58 and the annular chamber 88 above the collar 59 of the adjustable sleeve 45. As a consequence the latter moves away from the shoulder 47, against the pressure of spring 46, until it encounters the adjusting nut 48. On the other hand, the duct 60 with the plunger 53 is brought into communication with the duct 62 and the pipe 64, i. e., is relieved of pressure. The hydraulic pressure medium in the chamber of the spring 46 escapes through the duct 63 into the return pipe 64. As a result of the axial movement of the adjustable sleeve 45 the control shoulder 85 of the hydraulic copying attachment is moved downwards, so that the distance between the point of contact of the tracer or stylo 9 with the pattern 8, and the lathe tool 7, is diminished; this means that all machined diameters on the workpiece 4 become larger, so that the workpiece is machined to the contour 89.

As a result of the counterclockwise turning of the shaft 42 after it has been forced inwards in the direction of the arrow, the pin 84 of the lever 81 can avoid the pawl 43 (Figs. 3 and 6), and the lug 95 of the cam lever 87 is dragged along by the lug 82, so that the cam 55 is withdrawn to the left from its position below the face 41 of the bell-crank lever 40 (Fig. 8). This pivotal movement of the lever 81 is concluded when the plunger 53 bears on the left in its bore and on the right against the stop 54 (Fig. 1). As the cam 55 has now released the bell-crank lever 40, the slide bar 36 moves to the left as a result of the pressure in the chamber 78 of the control block 32. The lug 73 of the auxiliary lever 70 is thereby lifted from the auxiliary scanning lever 39, so that the scanning arm 68, whose tracer 9 is not at this moment resting on the pattern 8, is pivoted in a clockwise direction, as the spring 51 forces the control plunger 50 downwards. This closes the control gap 85 and the tool slide 6 rises until the stylo or tracer 9 touches the pattern 8 and equilibrium once again prevails in the hydraulic system; by this time the tool slide 6 with the lathe tool 7 has risen to such a point that the rough-turning contour 89 can be produced on the workpiece 4 in accordance with the pattern 8.

On the slide rail 25 secured to the tool slide 6 the adjustable trip blocks 91, 92 and 93 are so set that when the lifted position of the tool slide 6 is reached the trip block 91 is in front of the pawl 24, so that, via the control shaft 22 and the rod 21, the coupling member 20 comes into engagement the gearwheel 18, whereby, from a gear not shown and via the worm shaft 17, the worm 26, the wormwheel 27, the pinion 28 and the rack 29, a feed movement of the saddle 5 on the lathe bed 1 is effected. The saddle 5 is now fed forward the stylo or tracer point 9 scanning the pattern 8, as shown in Fig. 1.

*Lowering and return travel from the first cut.*—When the resetting lever 30 touches the left hand trip block 11, which has been fixed on the trip shaft 10 of the lathe bed 1 according to the length of the workpiece 4 to be machined, the resetting lever 30 is pivoted to the right into the position shown in dot-dash outline in Fig. 1 (Fig. 4). In the control block 32 the distributing slide valve 31 is moved to the left and the piston 34 thereby relieved of the pressure in the chamber 78, as the hydraulic pressure medium is able to escape through the duct 75 and the annular chamber 76 into the return pipe 64. The piston 34 with the rod 35 and the slide bar 36 is moved to the right by the spring 94, the auxiliary lever 70 being pivoted clockwise by the pressure of spring 71. The lug 73 rests on the auxiliary scanning lever 39 and likewise pivots it in a clockwise direction, so that the stylo 9 is lifted from the pattern 8 and the control plunger 50 is forced upwards against the pressure of the spring 51. Through the enlargement of the control gap 85 the pressure in chamber 65 declines and the tool slide 6 lowers until the auxiliary scanning lever 39 encounters the stop 37 and a condition of equilibrium again prevails in the hydraulic system, unless a resetting movement is previously initiated from another quarter.

During the lowering of the tool slide 6, the pawl 24 first slides on the trip block 92, thereby arresting the feed movement of the saddle 5; the pawl 24 then slides further on to trip block 93, thus initiating the return travel of the saddle 5 through the fact that the coupling member 20 comes into engagement with the gearwheel 19. During the lowering movement the pin 84 of the lever 81 slides over the pawl 43, which yields in a downward direction and, under the action of spring 44, snaps back into the position shown in the drawing.

When the saddle 5, on its return travel, approaches its right-hand end position, the lever 30, which is in the position shown in dot-dash outline in Fig. 1, encounters the trip block 12 and is swivelled into the position shown in continuous outline, whereby the pressure pipes 16 and 74 are brought into communication with the chamber 78.

*Raising of tool slide and copying of second cut.*—As a result of the pressure in the chamber 78, the piston 34, the rod 35 and the slide bar 36 are shifted to the left, so that, through the agency of the traveller roller 72, the lug 73 of the auxiliary lever 70 is lifted from the auxiliary scanning lever 39. The two levers 39 and 68 can now move freely, as the tracer point 9 is not resting on the pattern 8, and the control plunger 50 is forced downwards by the spring 51, whereby the control gap 85 is constricted. The pressure in the chamber 65 rises and the tool slide 6 begins to rise; the saddle 6, however, still moves to the right because the pawl 24 is still resting on trip block 93.

During the lifting movement of the tool slide 6 the pawl 24 passes from trip block 93, first to trip block 92, so that the return travel is arrested, and then to trip block 91, which re-engages the feed movement.

Figure 2:
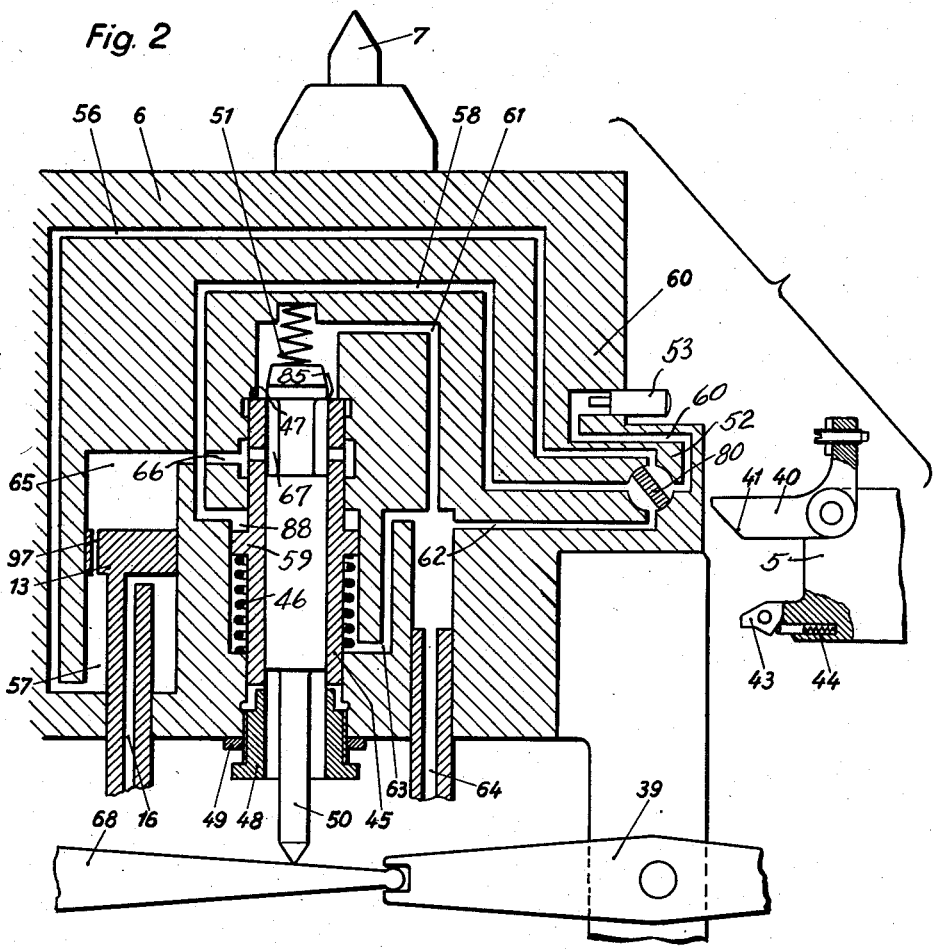
Fig. 2 is a schematic partial representation of the control members of the first embodiment; the tool slide is in the act of rising for the purpose of carrying out the second turning operation.
Figure 7:
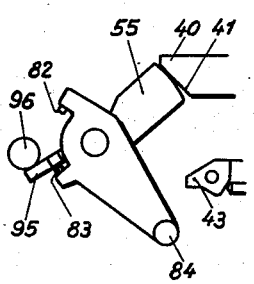
Fig. 7 is a schematic representation of the positions of the control, locking and tripping members in their position of readiness.

In addition, during the rising movement of the tool slide 6, the cam 55, which is in the position shown in Fig. 1, can pass the face 41 of the bell-crank lever 40 (Fig. 9), and immediately thereafter the lever 81, whose pin 84 bears against the pawl 43, which latter does not yield in an upward direction, is pivoted in a clockwise direction, with the result that the friction plate 80 of the distributing slide valve 52 also moves into the position shown in Fig. 2. From the pressure pipe 56 hydraulic pressure medium is supplied through the duct 60 into the space below the plunger 53, which plunger bears against the stop 54 and swivels the cam lever 87 in a clockwise direction until the lug 95 encounters the stop 96; it is retained in this position.

The annular chamber 88 above the collar 59 of the adjustable sleeve 45 is, by the friction plate 80 in the distributing slide valve 52, brought into communication through the ducts 58 and 62 with the return pipe 64, and the adjustable sleeve 45 is now forced upwards by the pressure of spring 46, whereby the control gap 85 is displaced in an upward direction. Since, owing to the rise of the tool slide 6, the pawl 24 is already resting on the trip block 93, the feed movement of the saddle 5 is initiated, and as the stylo 9 subsequently scans the pattern 8 the lathe tool 7 produces on the workpiece 4 the contour 90 of the second cut.

*Lowering and return travel from second cut.*—As the saddle 5 approaches its left-hand end position, the lowering movement and the resetting to return travel take place in the manner described under "Lowering and return travel from first cut." As the saddle 5 approaches its right-hand end position, the resetting lever 30 swings into the position shown in full outline in Fig. 1, and the tool slide 6 again begins to rise, as described under "Raising of tool slide and copying of second cut."

At the commencement of the rising movement, when the pawl 24 is bearing against the trip block 92, i. e., when the saddle 5 is stationary, the cam 55, which now occupies the position shown in Fig. 2, comes up against the face 41 of the bell-crank lever 40 (Fig. 7), whereby the slide bar 36 is shifted to the right until, through the traveller roller 72, the lug 73, the auxiliary scanning lever 39, the scanning arm 68 and the control plunger 50, a state of equilibrium in the hydraulic system is produced at the control gap 85. The tool slide 6 then halts on its upward travel, and as the feed movement is also halted, the machine is once more ready for a further two-cut cycle of operations.

When work commences, the pin 84 is, as mentioned at the outset, moved out of the range of the pawl 43 by pressing in the handwheel 79, and then the cam 55 is swivelled upwards from below the face 41 of the bell-crank lever 40 by rotation of the shaft 42 in a counter-clockwise direction (Figs. 7 and 8), as the lug 95 of the cam lever 87 bears against the lug 82.

Now the tool slide 6 continues to rise and the sequence of operations described commences anew.

In a further embodiment of the invention in accordance with Fig. 5 the sequence of operations and the method of changeover from the first to the second cut are similar to those described in the foregoing, so that only the details of the scanning arm resetting motion will be explained here:

Starting up: the same as in the case of the first embodiment. Copying the first cut: When the handwheel 79 is pressed in and then turned in a counterclockwise direction, hydraulic pressure medium is supplied through the duct 56, the friction plate 80, the duct 58 and the slot 109 into the compression chamber 110. The adjustable plunger 105 slides in a downward direction, overcomes the pressure of the spring 108, and forces the scanning arm 68 against the set screw 112. As a result of the change in the distance between the control gap 85 of the hydraulic copying system and the scanning arm 68, the contour 89 of the first cut is produced on the workpiece 4.

Lowering and return travel: the same as in the case of the first embodiment. Raising of tool slide and copying of second cut: As a result of the automatic pivoting of the lever 81 in a clockwise direction, the friction plate 80 of the distributing slide valve 52 takes up the position shown in Fig. 2, so that the duct 58 is placed in communication with the return pipe 64 via the duct 62. Through the action of the spring 108 on the set screw 112, the scanning arm 68 and the adjustable plunger 105 are forced upwards until the latter is halted in the control piston 102. On the subsequent scanning of the pattern 8 by the stylo 9, the contour 90 of the second cut is produced by the lathe tool 7 on the workpiece 4.

Lowering and return travel from second cut: the same as in the case of the first embodiment.

The use of the same pattern for the two successive turning operations affords the advantage that owing to the uniform chip-removal when copying the second cut greater precision is achieved.

I claim:

1. In a lathe, a hydraulic pattern copying attachment for performing a cycle of two successive turning operations, said attachment comprising in combination with a bed and a saddle movable thereon; a tool slide mounted on said saddle and displaceable transversely to the direction of movement thereof, said tool slide having an in-feed control passage formed therein, a control piston within said control passage, a scanning arm carried by said slide and engaging said control piston, a tracer point carried by said scanning arm and having an end adapted to engage said pattern, a distributing slide valve in said slide, a locking cam lever carried by said slide, a tripping pawl located in the path of said locking cam lever to automatically actuate said lever prior to the beginning of the second turning operation, resilient means engaging said tripping pawl, manually operable means connected with said locking cam lever for initiating the first turning operation, said slide having a valve passage formed therein and operatively connecting said distributing slide valve with said control passage and another passage operatively connecting said distributing slide valve with said locking cam lever, means supplying hydraulic pressure fluid to said control passage, a lathe tool support carried by said tool slide, and means carried by said slide and engaging said control piston, said control piston and the last-mentioned means being movable to vary said valve passage, whereby the operative distance between said lathe tool support and said end of the tracer point is varied.

2. An attachment in accordance with claim 1, wherein said tripping pawl is carried by said saddle.

3. In a lathe, a hydraulic pattern copying attachment for performing a cycle of two successive turning operations, said attachment comprising in combination with a bed and a saddle movable thereon; a tool slide mounted on said saddle and displaceable transversely to the direction of movement thereof, said tool slide having an in-feed control passage formed therein, a control piston within said control passage, a scanning arm carried by said slide and engaging said control piston, a tracer point carried by said scanning arm and having an end adapted to engage said pattern, a distributing slide valve in said slide, a locking cam lever carried by said slide, a tripping pawl located in the path of said locking cam lever to automatically actuate said lever prior to the beginning of the second turning operation, resilient means engaging said tripping pawl, manually operable means connected with said locking cam lever for initiating the first turning operation, said slide having a valve passage formed therein and operatively connecting said distributing slide valve with said control passage and another passage operatively connecting said distributing slide valve with said locking cam lever, means supplying hydraulic pressure fluid to said control passage, a lathe tool support carried by said tool slide, means carried by said slide and engaging said control piston, said control piston and the last-mentioned means being movable to vary said valve passage, whereby the operative distance between said lathe tool support and said end of the tracer is varied, an adjustable slide bar, and a leverage engaging said slide bar and connected with said scanning arm for shifting said control piston.

4. An attachment in accordance with claim 3, wherein the last-mentioned means varying the operative distance between said lathe tool support and said end of the tracer point comprise an adjustable plunger located within a cavity formed within said control piston, said cavity being in communication with said slide valve through said passages.

5. In a lathe, a hydraulic pattern copying attachment for performing a cycle of two successive turning operations, said attachment comprising in combination with a bed and a saddle movable thereon; a tool slide mounted on said saddle and displaceable transversely to the direction of movement thereof, said tool slide having an in-feed control passage formed therein, a control piston within said control passage, a scanning arm carried by said slide and engaging said control piston, a tracer point carried by said scanning arm and having an end adapted to engage said pattern, a distributing slide valve in said slide, a locking cam lever carried by said slide, a tripping pawl located in the path of said locking cam lever to automatically actuate said lever prior to the beginning of the second turning operation, resilient means engaging said tripping pawl, manually operable means connected with said locking cam lever for initiating the first turning operation, said slide having a valve passage formed therein and operatively connecting said distributing slide valve with said control passage and another passage operatively connecting said distributing slide valve with said locking cam lever, means supplying hydraulic pressure fluid to said control passage, a lathe tool support carried by said tool slide, and a perforated sleeve carried by said slide and engaging said control piston, said control piston and said sleeve being movable to vary said valve passage, whereby the operative distance between said lathe tool support and said end of the tracer point is varied.

6. In a lathe, a hydraulic pattern copying attachment for performing a cycle of two successive turning operations, said attachment comprising in combination with a bed and a saddle movable thereon; a tool slide mounted on said saddle and displaceable transversely to the direction of movement thereof, said tool slide having an in-feed control passage formed therein, a control piston within said control passage, a scanning arm carried by said slide and engaging said control piston, a tracer point carried by said scanning arm and having an end adapted to engage said pattern, a distributing slide valve in said slide, a locking cam lever carried by said slide, a tripping pawl located in the path of said locking cam lever to automatically actuate said lever prior to the beginning of the second turning operation, resilient means engaging said tripping pawl, manually operable means connected with said locking cam lever for initiating the first turning operation, said slide having a valve passage formed therein and operatively connecting said distributing slide valve with said control passage and another passage operatively connecting said distributing slide valve with said locking cam lever, means supplying hydraulic pressure fluid to said control passage, a lathe tool support carried by said tool slide, and an adjustable sleeve carried by said slide and engaging said control piston, said slide having other passages formed therein and operatively connecting said adjustable sleeve with said distributing slide valve, said control piston and said sleeve being movable to vary said valve passage for varying the operative distance between said lathe tool support and said end of the tracer point.

7. In a lathe carrying a pattern, a hydraulic pattern copying attachment for performing a cycle of two successive turning operations, said attachment comprising in combination with a bed and a saddle movable thereon; a differential piston carried by said saddle, a tool slide mounted on said saddle and displaceable relatively to said differential piston transversely to the direction of movement of said saddle, said tool slide having an in-feed control passage formed therein, a control piston within said control passage, a scanning arm carried by said slide and engaging said control piston, a tracer point carried by said scanning arm and having an end adapted to engage said pattern, a distributing slide valve in said slide, a locking cam lever carried by said slide, a tripping pawl located in the path of said locking cam lever to automatically actuate said lever prior to the beginning of the second turning operation, resilient means engaging said tripping pawl, manually operable means connected with said locking cam lever for initiating the first turning operation, said slide having a valve passage formed therein and operatively connecting said distributing slide valve with said control passage and another passage operatively connecting said distributing slide valve with said locking cam lever, means supplying hydraulic pressure fluid continuously to one side of said differential piston, means maintaining a constant hydraulic pressure upon the other side of said differential piston, a lathe tool support carried by said tool slide, and means carried by said slide and engaging said control piston, said control piston and the last-mentioned means being movable to vary said valve passage, whereby the operative distance between said lathe tool support and said end of the tracer point is varied.

References Cited in the file of this patent

UNITED STATES PATENTS

| Number | Name | Date |
|---|---|---|
| 571,901 | Heald | Nov. 24, 1896 |
| 2,133,191 | Danner | Oct. 11, 1938 |
| 2,433,048 | Himoff | Dec. 23, 1947 |
| 2,437,570 | Von Zelewsky | Mar. 9, 1948 |
| 2,456,158 | Tancred | Dec. 14, 1948 |
| 2,540,323 | Cross | Feb. 6, 1951 |

FOREIGN PATENTS

| Number | Country | Date |
|---|---|---|
| 597,017 | Great Britain | Jan. 15, 1948 |